(No Model.)
W. E. PRALL.
METHOD OF SUPPLYING STEAM AND HOT WATER FOR POWER AND HEATING PURPOSES.
No. 386,347. Patented July 17, 1888.
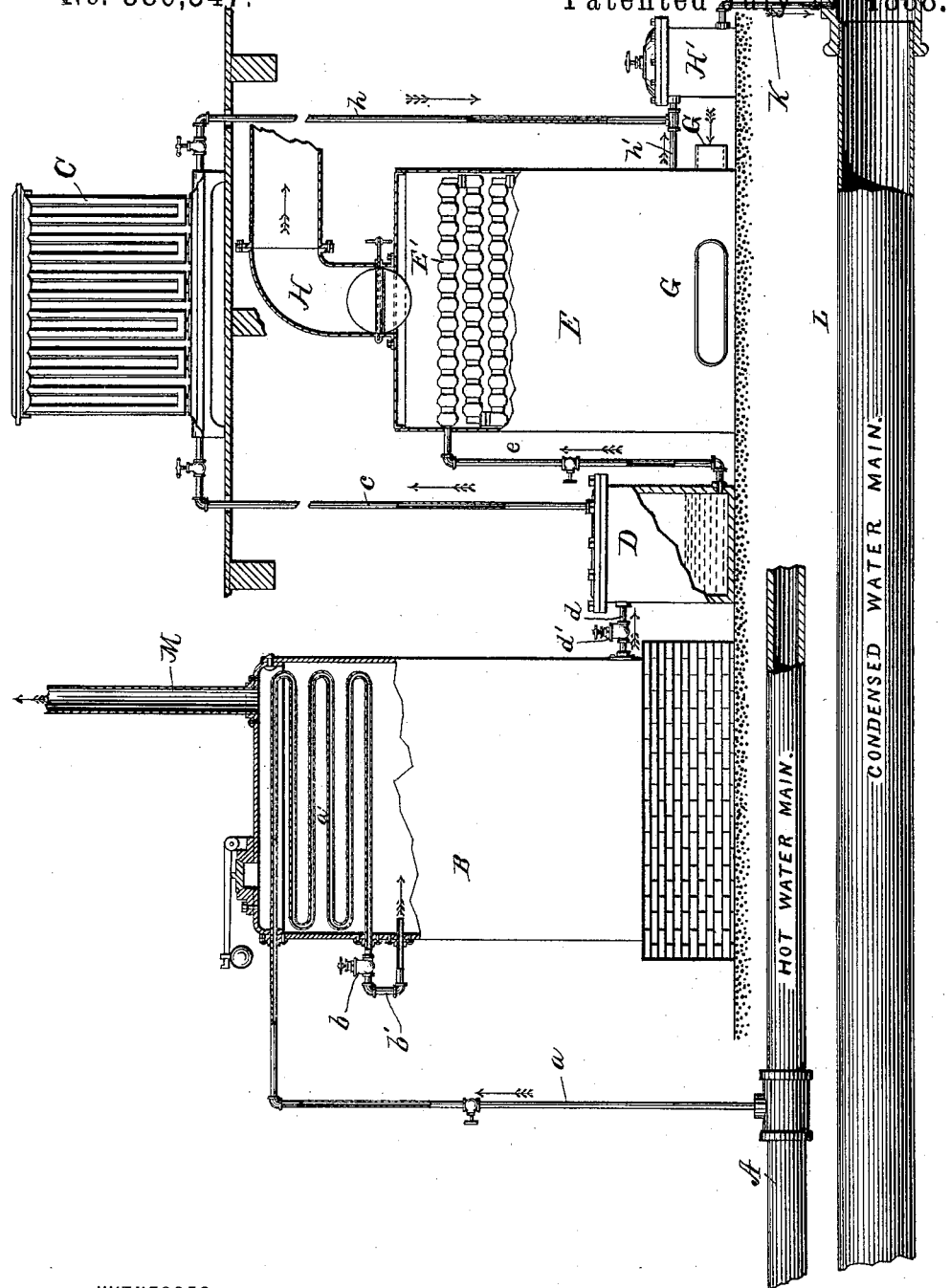
WITNESSES:
David B. Parker
Sadie Smith
INVENTOR.
Wm. E. Prall
BY
U. W. Canfield
ATTORNEY.

UNITED STATES PATENT OFFICE.

WILLIAM E. PRALL, OF WASHINGTON, DISTRICT OF COLUMBIA, ASSIGNOR TO THE NATIONAL HEATING COMPANY, OF NEW YORK, N. Y.

METHOD OF SUPPLYING STEAM AND HOT WATER FOR POWER AND HEATING PURPOSES.

SPECIFICATION forming part of Letters Patent No. 386,347, dated July 17, 1888.

Application filed February 24, 1888. Serial No. 265,199. (No model.)

*To all whom it may concern:*

Be it known that I, WILLIAM E. PRALL, a citizen of the United States, and a resident of Washington, in the District of Columbia, have invented a certain new and useful Method of Supplying Steam and Hot Water for Power and Heating Purposes, of which the following is a specification.

My invention relates to a novel method of supplying steam and hot water for power and heating purposes, and is disclosed in the following description and claims, reference being had to the accompanying drawing, forming part of the description, which represents, partly in section and partly in elevation, the preferred means for carrying my invention into effect, and in which like letters of reference designate similar parts wherever found.

My invention is designed, primarily, to be used in connection with my system of supplying heat and power as exhibited in United States Patents No. 208,633, granted October 1, 1878, and No. 376,830, granted January 24, 1888, in which superheated water is furnished from a central supply-station, from which steam for any purpose is produced at the points where the same is required simply by reducing the pressure and allowing the superheated water to expand into steam. It is evident, however, as will hereinafter appear, that the present invention may be used in connection with any system or means for supplying heat and power from superheated water, the object being to supply steam at high pressure for power purposes and at a lower pressure for heating purposes, and also to circulate the water of condensation for the purposes of direct or indirect radiation.

In the accompanying drawing, A represents a superheated-water main, which is in communication with a heater, as in the patents hereinbefore referred to.

B is a converter or steam-vessel in communication with the main A by means of a pipe, $a$, which is provided with a differential pressure-reducing valve, $b$, of any approved construction. The vessel B is provided with a coil, $a'$, in the upper part thereof, which communicates with or forms a part of the pipe $a$, and is also in communication with the valve $b$. The valve $b$ is located outside of the vessel B, as shown, and is provided with a pipe, $b'$, which forms a communication between said valve and the vessel B.

D is a second converter or steam-vessel in communication with the vessel B at the lower part thereof by means of a pipe, $d$, which is provided with a differential pressure reducing valve, $d'$, similar to that indicated at $b$.

C is a radiator of any desired construction, connected with the vessel D by a pipe, $c$, and E is a hot-air-chamber casing provided with a circulating-coil, E', which is in communication with the lower part of the vessel D by means of a pipe, $e$. The casing E has ingress-opening G at the bottom thereof, by which air is admitted thereto, and at the top a pipe, H, by which the hot air may be conveyed to the various apartments of a building for heating purposes.

H' indicates a steam or condense-water trap, which is in communication with the radiator C by means of a pipe, $h$, and with the circulating-coil E' in the casing E by means of a pipe, $h'$. The steam or condense-water trap H' is also provided with a pipe, K, by which the water of condensation is removed from the building where this system may be located, and if this improvement is used in connection with my system of supplying heat and power from a central station, as exhibited in the patents hereinbefore referred to, the pipe K may be in communication with a return or condense-water main, L, as shown, by which the water of condensation is returned to the heater. The pipes $a$, $d$, $c$, $e$, $h$, $h'$, and K, by which communication between the superheated-water supply and the vessels B D, the radiator C, coil E', trap H', &c., is established, are of course to be supplied with the necessary valves to control the circulation.

The operation is as follows: Water highly heated—say from 350° to 400° Fahrenheit—is taken from the supply-main A, under pressure, by means of the pipe $a$, passes through the coil $a'$ in the upper part of the converter or vessel D to the pressure-reducing valve $b$, where the pressure is reduced to any extent desired, from which it is conveyed to the interior of the vessel D by pipe $b'$, where it or a portion thereof immediately expands into steam. The differential valve b may be constructed to establish any ratio of difference desired, and it is evident that by means of the coil a', which has a much higher temperature than the steam in vessel B after passing through the reducing-valve, the steam formed in the converter or vessel B will be superheated and retained at high pressure, and may be conveyed by means of a pipe, M, to any point within a building where my improvement may be located for power or cooking purposes, or applied to any other use for which high-pressure steam is adapted. The superheated water admitted into vessel B will not, however, all be converted into steam by its own specific heat. A large portion thereof, which is still heated far above the steam-generating point, collects in the bottom of said vessel B, from which it passes under pressure through pipe d into vessel D, where steam at a lower pressure than that in vessel B is formed, which is conveyed by pipe c to the radiator C. The formation of steam and the precipitation or collection of the superheated water in vessel D are the same as in vessel B, the only difference being one of the degree of pressure of the steam and hot water. The steam formed in this instance, however, is amply sufficient for heating purposes, either by direct or indirect radiation. The differential valve d' may be omitted, if desired, as it is evident that in this relation it is not absolutely necessary, as the flow of the superheated water through the pipe d may be controlled with sufficient exactness by any ordinary valve. The water which collects in vessel D is still heated sufficiently high for the purposes of heating by circulation through coils or radiators either for direct or indirect radiation, and in this case is conveyed from vessel D by pipe e into and through coil E' in the casing E, and after passing through said coil it is conveyed into trap H', into which the water of condensation from radiator C is also discharged, and from trap H' the water passes to the return-main L, by which it is returned to the heater; or it may be discharged as waste into the sewer. My invention is not limited to the construction, location, and arrangement of parts shown and described herein, any construction or system of devices that will carry out the method hereinafter claimed being deemed within the scope thereof.

Having thus fully described my invention, its construction and operation, I claim and desire to secure by Letters Patent of the United States—

1. The herein-described method of supplying high and low pressure steam for power and heating purposes, which consists in supplying superheated water at high pressure, converting a portion thereof into high-pressure steam by allowing it to expand, and by converting a portion of the remainder into low-pressure steam by allowing it to expand, substantially as shown and described.

2. The herein-described method of supplying power and heat, which consists in supplying superheated water at high pressure, converting a portion thereof into steam at high pressure, which is supplied for power purposes, by allowing it to expand, converting a portion of the remainder into low-pressure steam, which is used for heating or other purposes, by allowing it to expand, and circulating the water not converted into steam for heating purposes, substantially as shown and described.

3. The herein-described method of supplying high and low pressure steam for power and heating purposes, which consists in supplying superheated water at high pressure, converting a portion thereof into high-pressure steam by allowing it to expand, superheating the steam thus formed, and converting a portion of the superheated water not formed into steam at the first expansion into steam at low pressure by allowing it to expand, substantially as shown and described.

4. The herein-described method of supplying power and heat, which consists in supplying superheated water at high pressure, converting a portion thereof into high-pressure steam for power purposes by allowing it to expand, superheating the steam thus formed, converting a portion of the superheated water not formed into steam at the first expansion into low-pressure steam for heating purposes by allowing it to expand, and circulating the remainder for heating purposes, substantially as shown and described.

5. The herein-described method of supplying steam and hot water for power and heating purposes, which consists in supplying superheated water at high pressure, converting a portion thereof into steam for power purposes by allowing it to expand, superheating the steam thus formed, and circulating the water not formed into steam for heating purposes, substantially as shown and described.

Signed at New York, in the county of New York and State of New York, this 10th day of February, A. D. 1888.

WM. E. PRALL.

Witnesses:
DANIEL E. DELAVAN,
WILLIAM EGAN.